W. ARMOUR.
INDICATING AND RECORDING APPARATUS FOR PYROMETERS AND THE LIKE.
APPLICATION FILED JAN. 22, 1907.
921,500.
Patented May 11, 1909.
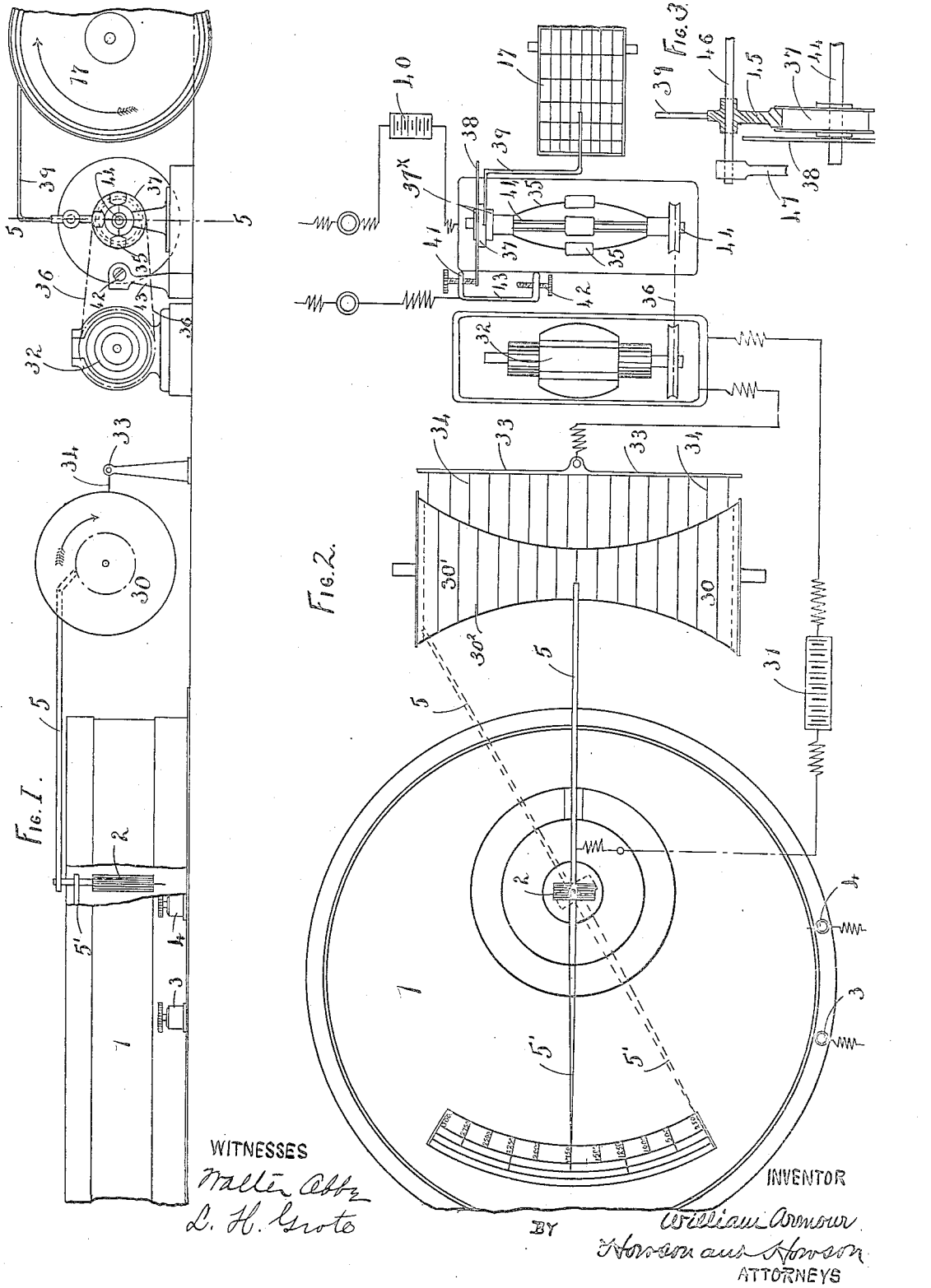
WITNESSES
INVENTOR
William Armour
BY Howson and Howson
ATTORNEYS

UNITED STATES PATENT OFFICE.

WILLIAM ARMOUR, OF IRVINE, SCOTLAND.

INDICATING AND RECORDING APPARATUS FOR PYROMETERS AND THE LIKE.

No. 921,500.  Specification of Letters Patent.  Patented May 11, 1909.

Application filed January 22, 1907. Serial No. 353,518.

*To all whom it may concern:*

Be it known that I, WILLIAM ARMOUR, mining engineer, a subject of the King of Great Britain and Ireland, and a resident of Irvine, Ayrshire, Scotland, have invented certain new and useful Improvements in Indicating and Recording Apparatus for Electric Pyrometers and the Like, of which the following is a specification.

This invention has reference to improvements in indicating and recording apparatus for electric pyrometers and the like.

In the iron, steel, and kindred metallurgical industries and in pottery and like works wherein heat or high temperatures is or are employed, modern requirements and developments demand that these temperatures be managed, controlled or regulated with greater precision and exactness than in times past.

Hitherto, instruments designed for the indicating and registration graphically of such temperatures have been burdened with cost in no way commensurate with their practical utility and moreover combine in their construction too many complicated refinements liable to derangement, and in addition being too readily subject to local electrical disturbances and mechanical vibrations their action in practice is both irregular and uncertain and devoid of precision. Further, former inventors in this field seem to have overlooked the fact that, in most industrial processes where high temperatures are employed and require to be regulated, what is of most practical value to the practical men responsible is that the temperatures employed in the process under their supervision should not be allowed to fall and rise below and above a certain minimum and maximum; and that when either of these points are approached or reached some audible warning signal may be given so as to avoid the need for watching a record line and the probability of misreading same and further that such audible warning signal shall continue to operate until the condition of matters considered as undesirable has been put right.

My invention has for its object primarily to combine in one apparatus or system specially arranged means of indicating and recording temperatures electrically, either constantly, intermittently, and when the maximum and minimum temperatures are attained including an arrangement whereby audible warning is given at the moment any degree of heat predetermined as undesirable is reached and which continues to operate until such a condition has been rectified.

In order that my said invention and the manner of carrying same into practice may be properly understood I have hereunto appended a sheet of explanatory drawings in which—

Figures 1 and 2 are an elevation and plan view of one arrangement illustrating my improvements for indicating and recording temperatures graphically and at the same time simultaneously giving an audible warning when any pre-arranged minimum and maximum temperature has been approached or reached; the parts being so arranged that the recording part of the apparatus is constantly in operation; and Fig. 3 is a view partly an end elevation and partly a section taken on the line 5—5, Fig. 1.

In the above drawings, the functions of the apparatus as shown in this arrangement are discharged in the following manner. The thermo electric current to be indicated and recorded enters the delicate electric meter 1 at terminals 3 and 4. The coil 2 of the electric meter is moved, by the inflow of this current, and carries with it the contact arm 5 (insulated from 2) which is mounted so as to have its outer extremity constantly in easy contact with the revolving contact cylinder 30. To insure that the outer point of arm 5 shall always exercise a constant pressure of contact on surface of 30 in its radial movement from one side of 30 to the other, it is necessary to construct the cylinder 30 with a concave surface as shown when the point of 5 is in touch with 30 at a point inside a line parallel with the axis of cylinder 30. The amount of curvature necessary on the surface of cylinder 30 in either circumstance is ascertained by the plotting of a diagram having for its basis, length of arm 5, diameter of cylinder 30 at center, and point of contact between 5 and 30. The contact cylinder 30 is divided into any desired number of divisions, each insulated from the other by a thin sheet of mica $30^2$, or other suitable insulation, and turned smooth on its surface.

The arm 5 carries one terminal of relay current from battery 31, the other terminal of which after being put in circuit with small motor 32 terminates at bar 33 between which and cylinder 30 are inserted a set of graduated resistances 34. The motor 32 is operated by current from 31 and its velocity controlled by amount of current allowed to pass to it through 5, 30, 33 and 34. The motor 32 is geared to sensitive governor 35 and connected thereto by a light rubber or other suitable band 36. The governor 35 is so constructed that its end at 37 and 38 (section of which is given in Fig. 3) is free to move along its axis. The loose or free ring 37 (Fig. 2) is kept in position between two fixed rings or collars 37× (as shown) and carries with it the arm 39 to which is attached the recording point which in turn is kept in constant touch with paper on drum 17. From this it will be clear that the movement of recording arm 39 has a movement in sympathy with indicating and contact arm 5 and will accordingly trace a line on paper or drum 17 representing the force of thermo electric current affecting the coil 2. There can be combined in this form of the apparatus an arrangement whereby audible warning or alarm will be given when any predetermined minimum or maximum temperature has been reached, and this is accomplished by fixing a contact plate or disk 38 free on the moving end or sleeve of governor 35.

The alarm circuit from battery 40 has one terminal attached to (or in contact with 38) as shown, the other terminal being finished at adjustable point of contacts 41 and 42 mounted in support 43, 41 representing the minimum and 42 the maximum temperatures.

Fig. 3 shows the means whereby the movement of recording arm 39 is maintained in a truly horizontal plane by the rotary and lateral movement of the free sleeve 39× on governor 35. 44 is the shaft of governor 35. While 38 and 37 are free to move along 44 being moved from one point to another by expansion of springs 35. 45 is the carrier slide for recording arm 39 and is supported and kept in its true position horizontally and vertically by rod 46 fixed in supporting pillar 47.

What I claim is:—

In combination with a pyrometer, a recording apparatus comprising a constant source of current, a movable pointer connected therewith, a revolving cylinder having a plurality of graduated parallel resistances thereon adapted to close the circuit with the pointer, a motor in circuit with said resistances supplied from said source of current, and a paper carrying drum on which the speed of the motor is recorded for measuring the current passed through the pyrometer.

In testimony whereof I have signed my name to this specification, in the presence of two subscribing witnesses.

WM. ARMOUR.

Witnesses:
R. C. THOMSON,
WM. RUTHERFORD.